(12) United States Patent
Bensberg et al.

(10) Patent No.: US 11,176,105 B2
(45) Date of Patent: Nov. 16, 2021

(54) SYSTEM AND METHODS FOR PROVIDING A SCHEMA-LESS COLUMNAR DATA STORE

(71) Applicant: SAP SE, Walldorf (DE)

(72) Inventors: Christian Bensberg, Heidelberg (DE); Steffen Geissinger, Wiesloch (DE)

(73) Assignee: SAP SE, Walldorf (DE)

( * ) Notice: Subject to any disclaimer, the term of this patent is extended or adjusted under 35 U.S.C. 154(b) by 279 days.

(21) Appl. No.: 15/964,612

(22) Filed: Apr. 27, 2018

(65) Prior Publication Data

US 2019/0332695 A1    Oct. 31, 2019

(51) Int. Cl.
*G06F 16/21* (2019.01)
*G06F 16/93* (2019.01)
*G06F 16/22* (2019.01)

(52) U.S. Cl.
CPC .......... *G06F 16/211* (2019.01); *G06F 16/221* (2019.01); *G06F 16/93* (2019.01)

(58) Field of Classification Search
CPC ....... G06F 16/211; G06F 16/221; G06F 16/93
See application file for complete search history.

(56) References Cited

U.S. PATENT DOCUMENTS

| 10,061,834 | B1* | 8/2018 | Kulesza | G06F 16/283 |
|---|---|---|---|---|
| 2006/0053122 | A1* | 3/2006 | Korn | G06F 16/84 |
| 2007/0233749 | A1* | 10/2007 | Dittrich | G06F 16/2228 |
| 2008/0091691 | A1* | 4/2008 | Tsuji | G06F 16/284 |
| 2012/0185373 | A1* | 7/2012 | Grody | G06Q 40/04 705/37 |
| 2015/0026189 | A1* | 1/2015 | Li | G06F 16/245 707/741 |
| 2015/0088924 | A1* | 3/2015 | Abadi | G06F 16/90335 707/769 |
| 2016/0055143 | A1* | 2/2016 | Goel | G06F 21/6218 715/229 |
| 2016/0275201 | A1* | 9/2016 | Li | G06F 16/221 |
| 2018/0121110 | A1* | 5/2018 | Sawhney | G06F 3/067 |

* cited by examiner

*Primary Examiner* — Alford W Kindred
*Assistant Examiner* — Lin Lin M Htay
(74) *Attorney, Agent, or Firm* — Buckley, Maschoff & Talwalkar LLC

(57) ABSTRACT

A data storage and retrieval system for a computer memory configured according to a columnar document store adapted to contain one or more documents. The columnar document store includes a dictionary containing one or more identifiers, each of the identifiers being associated in the dictionary with a value ID. The document store further includes a data structure having fields and containing at least a first column. The first column is associated with a first identifier of the one or more identifiers, and the first identifier is associated with a first set of values in a first set of documents which contain the first identifier. The first column includes a value ID of the first identifier, one or more document IDs, each identifying a document in the first set of documents, and the first set of values.

17 Claims, 11 Drawing Sheets

{"name": "joe"}

| 0 | SIZE | S4 | name | S | 3 | joe |
|---|------|----|----|---|---|-----|
| 1b | 4b | 1b | 4b | 1b | 1b | 3b |

FIG.2A

{"error": true, "code": 25}

| 0 | SIZE | S5 | error | T | S4 | code | U | 25 |
|---|------|----|----|---|----|------|---|----|
| 1b | 4b | 1b | 5b | 1b | 1b | 4b | 8b | 1b |

FIG.2B

```
{
  "name": "Joe",
  "age": 25,
  "hobbies": ["soccer", "swimming"],
  "address": {
      "street": "4 Pennsylvania Plaza",
      "city": "New York"
  }
}
```

FIG.3A

| | |
|---|---|
| 0 | name |
| 1 | age |
| 2 | hobbies |
| 3 | address |
| 4 | street |
| 5 | city |

FIG.3B

```
{
    0: "Joe",
    1: 25,
    2: ["soccer", "swimming"],
    3: {
            4: "4 Pennsylvania Plaza",
            5: "New York"
        }
}
```

FIG.3C

SYSTEM AND METHODS FOR PROVIDING A SCHEMA-LESS COLUMNAR DATA STORE

FIELD OF THE INVENTION

The disclosed embodiments are directed to providing a schema-less columnar data store.

BACKGROUND

A document database, also referred to as a document store, differs significantly from a traditional relational database. Relational databases generally store data in separate tables with a strict layout that is pre-determined by application developers. Often a piece of data, i.e. a "data object", may be spread across several tables (i.e., "normalization"). Meanwhile, document databases can store all information for a given object in a single unit, in just one database artifact, and each stored object can differ from other stored objects. In other words, there may be no internal structure that maps directly onto the concept of a table, and the fields and relationships generally don't exist as predefined concepts. Instead, all of the data for an object is placed in a single document, and stored in the document database as a single entry. The structure or layout of the document is part of the stored data itself. This is being referred to as semi-structured. With a document store, there is no need to transform objects into a relational model ("object-relational mapping"). Accordingly, a document store is attractive in applications that are handling semi-structured data. A typical use case is storing JSON documents (JavaScript Object Notation) which is often used in web applications or in application that are subject to continual change in place, and where speed of deployment is an important issue.

A data structure may store documents in consecutive data locations, which may be considered to be row storage of the documents. In such a configuration, an index may be used to perform search functionality, e.g., to find documents containing a particular value. Indexes must be built up, i.e., generated, and maintained as the underlying data changes. Moreover, the indexes must store a copy of the values (or hash values) used to perform the indexing, which is redundant with the values stored in the database corpus itself and requires a significant amount of memory resources.

SUMMARY

In one aspect, the disclosed embodiments provide a data storage and retrieval system for a computer memory, and a corresponding method and computer-readable medium storing instructions to execute the method. The system includes a processor programmed to configure the computer memory according to a columnar document store adapted to contain one or more documents, each document comprising one or more identifier-value pairs. The columnar document store includes a dictionary containing one or more identifiers of the identifier-value pairs, each of the identifiers being associated in the dictionary with a value ID. The columnar document store further includes a data structure having a plurality of fields and containing at least a first column. The first column is associated with a first identifier of the one or more identifiers, and the first identifier is associated with a first set of values in a first set of documents which contain the first identifier. The first column includes a value ID of the first identifier, one or more document IDs, each identifying a document in the first set of documents, and the first set of values.

Embodiments may include one or more of the following features.

The first column may further include a size of the first column, a data type of the first set of values, and a count of the first set of documents. If the data type of the first set of values is string, the first column may further include offsets in correspondence with the document IDs (or in correspondence with all but a first one of the document IDs), and the first set of values may be stored at positions indicated by the offsets. The offsets may all be stored in the data structure at positions which precede the stored first set of values. The data structure may contain a second column following the first column.

The second column may be associated with a second identifier of the one or more identifiers, and the second identifier may be associated with a second set of values in a second set of documents which contain the second identifier. The second column may include a value ID of the second identifier, one or more document IDs, each identifying a document in the second set of documents, and the second set of values stored at successive positions in the data structure.

The second column may be associated with a second identifier of the one or more identifiers, and the second identifier may be associated with a second set of values in a second set of documents which contain the second identifier. The second column may include a value ID of the second identifier, and a classification of the second column indicating a nested object. The data structure may contain a third column for storing the nested object. The third column may be associated with a third identifier of the one or more identifiers, and the third identifier may be associated with a third set of values in a third set of documents which contain the third identifier. The third column may include: a value ID of the third identifier, one or more document IDs, each identifying a document in the third set of documents, and the third set of values stored at successive positions in the data structure.

The second column may be associated with a second identifier of the one or more identifiers, and the second identifier may be associated with a set of array values in a second set of documents which contain the second identifier. The second column may include a value ID of the second identifier, a classification of the second column indicating an array. The second column may include one or more document IDs, each identifying a document containing one or more array values of the set of array values, the document IDs being repeated for each array value contained in a respective document, and the set of array values stored at successive positions in the data structure.

BRIEF DESCRIPTION OF THE DRAWINGS

FIGS. 2A and 2B are examples of data structure diagrams showing JSON data stored as binary data;

FIG. 3A depicts an example document containing JSON data;

FIG. 3B depicts a dictionary for use with the JSON data of FIG. 3A;

FIG. 3C depicts the document of FIG. 3A with the JSON data compressed using the dictionary of FIG. 3B;

DETAILED DESCRIPTION

Figure 1:
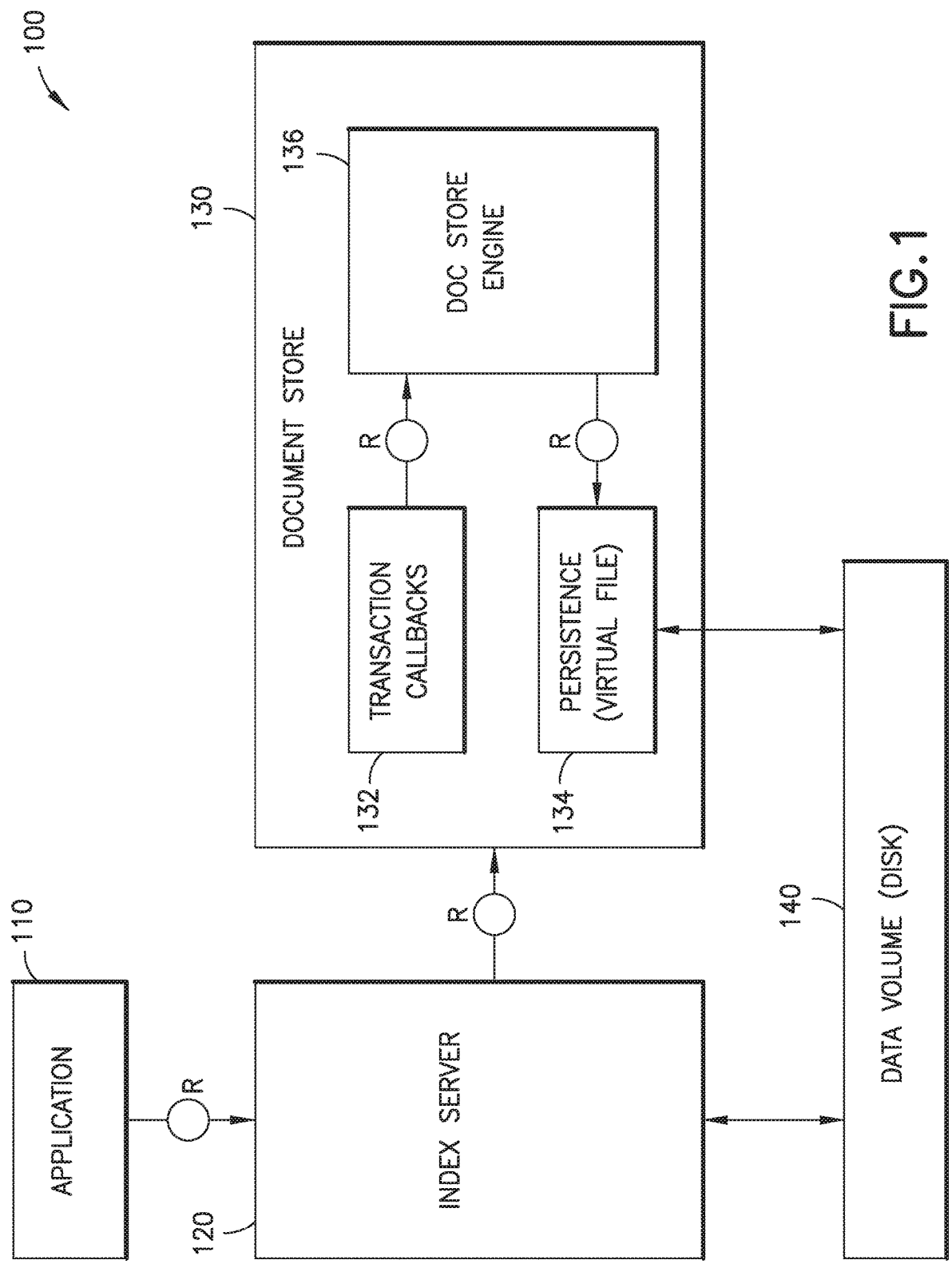
FIG. 1 is a block diagram of a database computing architecture including a document store.

FIG. 1 is a block diagram of a database computing architecture including a document store (referred to as "DocStore"), which is a store for JavaScript Object Notation (JSON) artifacts and which allows native operations on JSON, including filtering, aggregation, and joining JSON documents with column or row store tables. JSON documents are stored in so-called "collections." The content of a JSON document may be deeply structured but has no static schema. This means that any valid JSON data may be inserted without first declaring its structure.

The architecture 100 includes an application 110 that interacts with an index server 120 for processing client/application requests. The index server 120 manages a document store 130 which may be an in-memory data structure such as dynamic random access memory (DRAM) or the like storing client data. The index server 120 and the document store 130 may both store data to disk 140. For example, the document store 130 may store checkpoints to disk 140, in response to the system requesting a checkpoint operation.

The database computing architecture 100 may be incorporated within a database system such as an in-memory, column-oriented, relational database management system that functions as a database server to store and retrieve data as requested by software applications. The database system may combine both online analytical processing (OLAP) and online transaction processing (OLTP) operations into a single system. The database system may store data in main memory (e.g., document store 130) rather than on disk 140 which provides for faster data access, and by extension, faster querying and processing. The document store 130 may be provided in addition to other types of storage architectures, such as, for example, a column store and a row store (not shown). In disclosed embodiments, the document store 130 is an independent store which interacts with either of the column store and the row store for data storage.

In disclosed embodiments, the index server 120 may perform session management, authorization, transaction management and command processing. Although shown as separate components in the example of FIG. 1, in some cases, the index server 120 may include the document store 130 as the engines for processing the data. The client application 110 may submit structured query language (SQL) and multidimensional expression (MDX) statements to the index server 120 in the context of authenticated sessions and transactions which may be executed on data included in the document store 130 as well as other data stores. The index server 100 also manages persistence between cached memory images of database objects, log files and permanent storage files.

An application 110 provided by a user may perform operations on the database. Connection and session management processes may be performed by the index server 120 to create and manage database clients and the corresponding applications such as the user's application 110. Once a session is established, the application 110 can communicate with the database using SQL statements, for example. For each session, a set of parameters may be maintained such as auto-commit, current transaction isolation level, etc. Also, users may be authenticated either by the database itself (e.g., login with username and password) or authentication may be delegated to an external authentication provider, such as an LDAP directory.

In disclosed embodiments, client requests (e.g., requests originating from the application 110) are analyzed and executed by the index server 120. For example, incoming SQL requests may be routed to an SQL processor of the index server. Data manipulation statements may be executed by the SQL processor. As another example, other types of requests may be delegated to other components. For example, data definition statements may be dispatched to a metadata manager, transaction control statements may be forwarded to a transaction manager, planning commands may be routed to a planning engine and procedure calls may be forwarded to a stored procedure processor. An SQL statement may be processed in the context of a transaction. New sessions may be implicitly assigned to a new transaction. The transaction manager may coordinate database transactions, controls transactional isolation and keeps track of running and closed transactions. When a transaction is committed or rolled back, the transaction manager informs the involved engines (e.g., document store 130, column store, row store, etc.) about this event so they can execute necessary actions. The transaction manager also cooperates with a persistence layer of the index server to store data to disk 140 to achieve atomic and durable transactions.

In disclosed embodiments, the index server 120 may provide a metadata manager component. The metadata may include a variety of objects, such as, for example, definitions of relational tables, columns, views, indexes and procedures. Metadata of all these types may be stored in one common database catalog for all stores. The database catalog may be stored as tables in a row store. The features of the database, such as transaction support and multi-version concurrency control, are also used for metadata management.

The index server 120 may support a number of data stores of different types (i.e., having different engines) such as a document store 130, a column store, and a row store, and the like. As described herein, a store is a sub-system of the database which includes in-memory storage, as well as the components which manage the storage. For example, a row store may be a database row-based in-memory relational data engine. Meanwhile, a column store may store tables column-wise. The document store 130 (also referred to as a JSON document store) may store documents in the form of collections. The need to store unstructured data such as social media, multimedia, etc. has grown rapidly. SQL meanwhile requires structure to be specified in advance which means that any changes to the information schema require time-consuming alter statements to run on a table. The document store 130 overcomes this issue by loosening the restrictions on database schema and allows data to be grouped together more logically and naturally. In the document model, each record and its associated data is through of as a "document."

In the document store 130, all data related to a database object is encapsulated together. As a result, documents are independent units which make performance better and make it easier to distribute data across multiple servers while preserving locality. Furthermore, application logic is easier to write because no translation is needed between objects in an application and SQL queries. Rather, the object model can be turned directly into a document. Also, unstructured data can be stored easily since a document may contain whatever keys and values the application logic requires. The callback transaction layer 132 may receive requests from the index server 120 and process those requests on content stored in the document store engine 136.

The document store 130 may also include a persistence layer 134 which provides data persistency to disk 140. Like a traditional database, page management and logging may be performed by the persistence layer 134. According to various embodiments, the changes made to the in-memory database pages may be persisted through checkpoints. Checkpoints may be written to data volumes on the persistent storage 140 for which the storage medium is hard drives. All transactions committed in the database are stored/saved/referenced by a logger 134 of the persistence layer 134 in a log entry written to the disk 140 on the persistent storage. To get high I/O performance and low latency, log volumes may use flash technology storage. Furthermore, the persistence layer 134 is responsible for durability and atomicity of transactions. This layer ensures that the database is restored to the most recent committed state after a restart or other loss and that transactions are either completely executed or completely undone. To achieve this in an efficient way, the persistence layer 134 uses a combination of checkpoints and logs.

FIGS. 2A and 2B are data structure diagrams showing JSON data stored as binary data. JavaScript Object Notation (JSON) is an open-standard file format that uses human-readable text to transmit data objects including attribute-value pairs and array data types (or any other serializable value). JSON's basic data types are: Number (e.g., a signed decimal number); String (e.g., a sequence characters delimited with double-quotation marks); Boolean (either of the values true or false); Array (an ordered list of zero or more values, each of which may be of any type—Arrays use square bracket notation and elements are comma-separated); Object (an unordered collection of name-value pairs where the names, also called "keys" or "identifiers," are strings—Objects are delimited with curly brackets and use commas to separate each pair, while within each pair the colon character separates the key or name from its value; Null (an empty value, using the word "null"). JSON documents are delimited by a pair of curly brackets (i.e., braces) as the outermost characters. FIGS. 3A and 3C show JSON documents that are formatted with line breaks and tabs for easier readability. Whitespace does not change the semantics of a document.

In the first example data structure 210, depicted in FIG. 2A, an object 215 having the identifier 220 "name" and the value 225 "joe" is stored in binary form. The first field 230 (1 byte) of the data structure is the data type, which in this example is "O" for object. The second field 235 (4 bytes) is the size of the data structure, i.e., the size of the data structure of the entire object. The third field 237 (1 byte) is the size of the identifier. Because the first element of an object is always an identifier 220, which is always a string, it not necessary to separately indicate the data type of the identifier 220. Therefore, "S4" may be used to indicate that the string has a size of four characters. The fourth field 240 (4 bytes) is the identifier 220, "name". The fifth field 242 (1 byte) is the data type of the value 225 which is paired with the identifier 220 "name". In this example, the value 225 ("joe") is a string ("S"). The sixth field 244 in this example (1 byte) is the size of the value, which is three characters. The seventh field 246 in this example is the value 225, which is a string: "joe". The string value is directly stored as part of the binary JSON data.

In the second example data structure 250, depicted in FIG. 2B, an object 255 having two identifier-value pairs is stored in binary form: a first pair with "error" as the identifier 252 and "true" as the value 254; and a second pair with "code" as the identifier 256 and the unsigned integer 25 as the value 258. The first field 260 (1 byte) of the data structure 250 is the data type, which in this example is "O" for object. The second field 262 (4 bytes) is the size of the data structure, i.e., the size of the data structure of the entire object. The third field 264 (1 byte) is the size of the identifier 252 of the first identifier-value pair, e.g., "S5," which indicates that the identifier 252 ("error") has a size of five characters (the identifier always being a string). The fourth field 266 (5 bytes) is the identifier 252, "error". The fifth field 268 (1 byte) is the value 254 of the first identifier-value pair, which is a boolean value, "T" (a data type being unnecessary, as it can be inferred from the value). The sixth field 270 (1 byte) is the size of the identifier 256 of the second identifier-value pair, e.g., "S4," which indicates that the identifier 256 ("code") has a size of four characters (the identifier always being a string). The seventh field 272 (4 bytes) is the identifier 256, "code". The eighth field 274 (1 byte) is the data type of the value 258, which is "U" for unsigned integer. The ninth field 276 (8 bytes) is the value 258, which is the unsigned integer 25 (a size being unnecessary, as it can be inferred from the data type).

FIGS. 3A-3C depict an example document containing JSON data which is compressed using a dictionary. The document includes the identifiers: "name" (which has a string as its value), "age" (which has an unsigned integer as its value), "hobbies" (which has an array as its value), and "address" (which has a nested object as its value). The nested object which is the value associated with the "address" identifier has two identifier-value pairs: "street" (which has a string as its value) and "city" (which has a string as its value). Thus, there is a total of six identifiers contained in the example document.

As shown in FIG. 3B, the identifiers are included in a dictionary in which each identifier has a corresponding lookup value (e.g., 0, 1, 2, 3, etc.). FIG. 3C shows the JSON document of FIG. 3A stored in a compressed format in which the identifiers have been replaced by their corresponding dictionary lookup values. The lookup values each require only one byte to be stored in the data structure of the document, as opposed to a byte for each character of the identifier string. This results in a significantly smaller size for the document as a whole.

Figure 4:
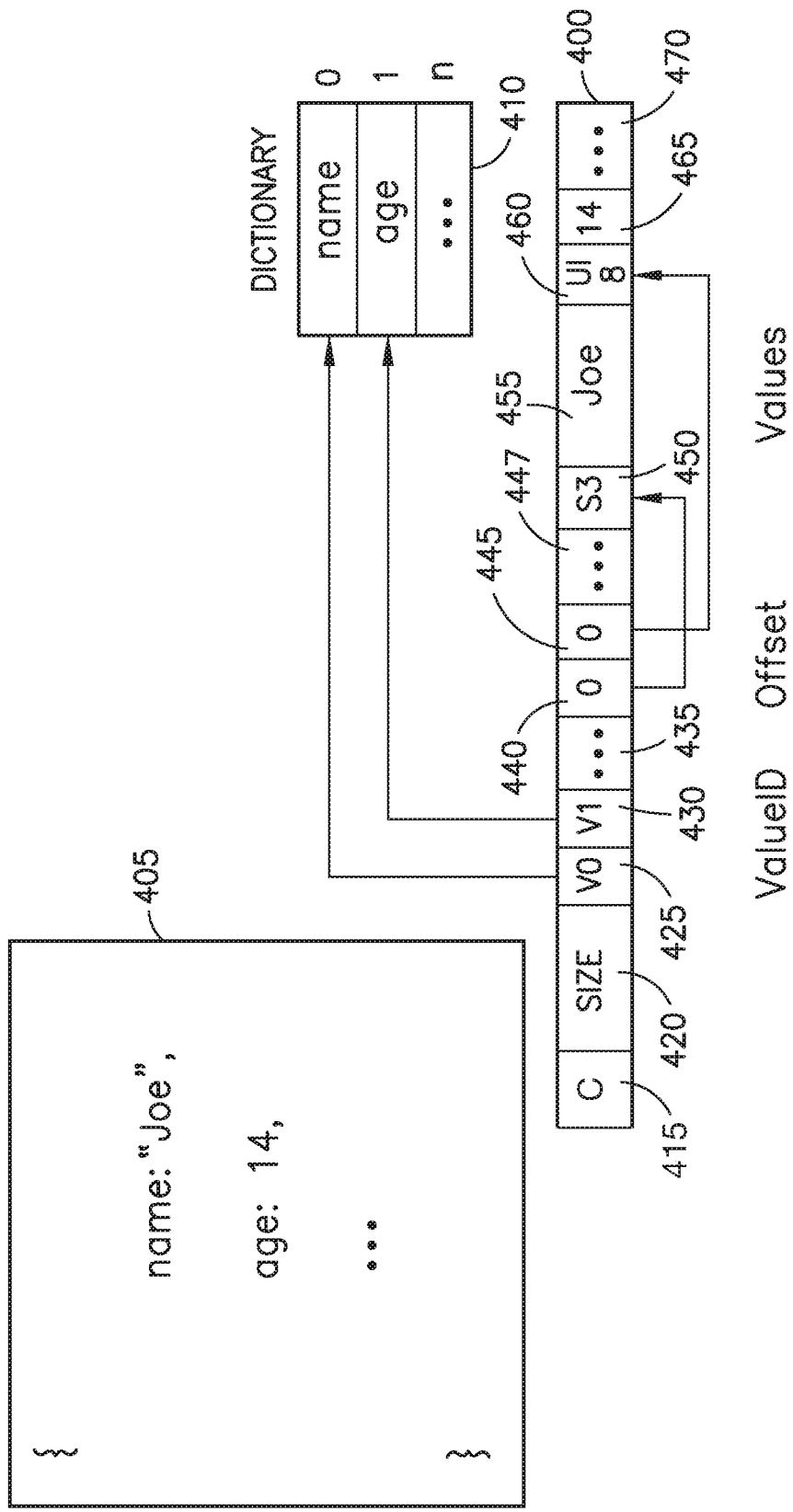
FIG. 4 is a data structure diagram showing a document containing JSON data stored as binary data compressed using a dictionary.

FIG. 4 is a data structure 400 diagram showing a document 405 containing JSON data stored as binary data compressed using a dictionary 410. The data structure 400 stores the entire document 405 in consecutive data locations and is therefore considered to be row storage of the document 405. The first field 415 of the data structure 400 indicates a "Compressed Object". The second field 420 is the size of the data structure 400, i.e., the size of the data structure of the entire object. The third field 425 is the valueID of the identifier of the first identifier-value pair, i.e., the value "V0," which indicates that the first identifier ("name") is the first entry in the dictionary 410 of identifiers. The fourth field 430 is the valueID of the identifier of the second identifier-value pair, i.e., the value "V1," which indicates that the second identifier ("age") is the second entry in the dictionary 410. This may be followed by additional valueID fields 435 for additional identifiers contained in the document 405.

The valueID fields (430 and 435) are followed by a number of offset fields (440, 445, and 447) (1 byte) which point to the relative location in the data structure 400 of the value of each identifier-value pair of the document, e.g., by providing a number of bytes between the offset field and the value to which the offset field is pointing. In the example depicted, the offset 440 of the value of the first identifier-value pair ("Joe") is the relative location, e.g., in bytes, of the position in the data structure 400 where the value is stored. The first byte 450 of the storage position of the first value indicates the data type and size of the first value, e.g., "S3," which indicates that the value ("Joe") is a string having a size of three characters. This is followed by the stored first value itself 455, which in this case occupies three bytes of the data structure. The offset 445 corresponding to the value of the second identifier-value pair (i.e., 14) points to a location in the data structure 400 which follows the stored value of the first identifier-value pair. The first byte 460 of this location indicates the data type and size of the second value, e.g., "UI8," which indicates that the value (14) is an unsigned integer (which implicitly has a size of, e.g., eight bytes). This is followed by the stored second value itself 465. The offsets 447 of additional identifier-value pairs follow in the same portion of the data structure as the offsets of the first and second pairs (440 and 445). The identifiers and values of additional identifier-value pairs would be stored in subsequent locations 470 in the data structure 400.

Figure 5:
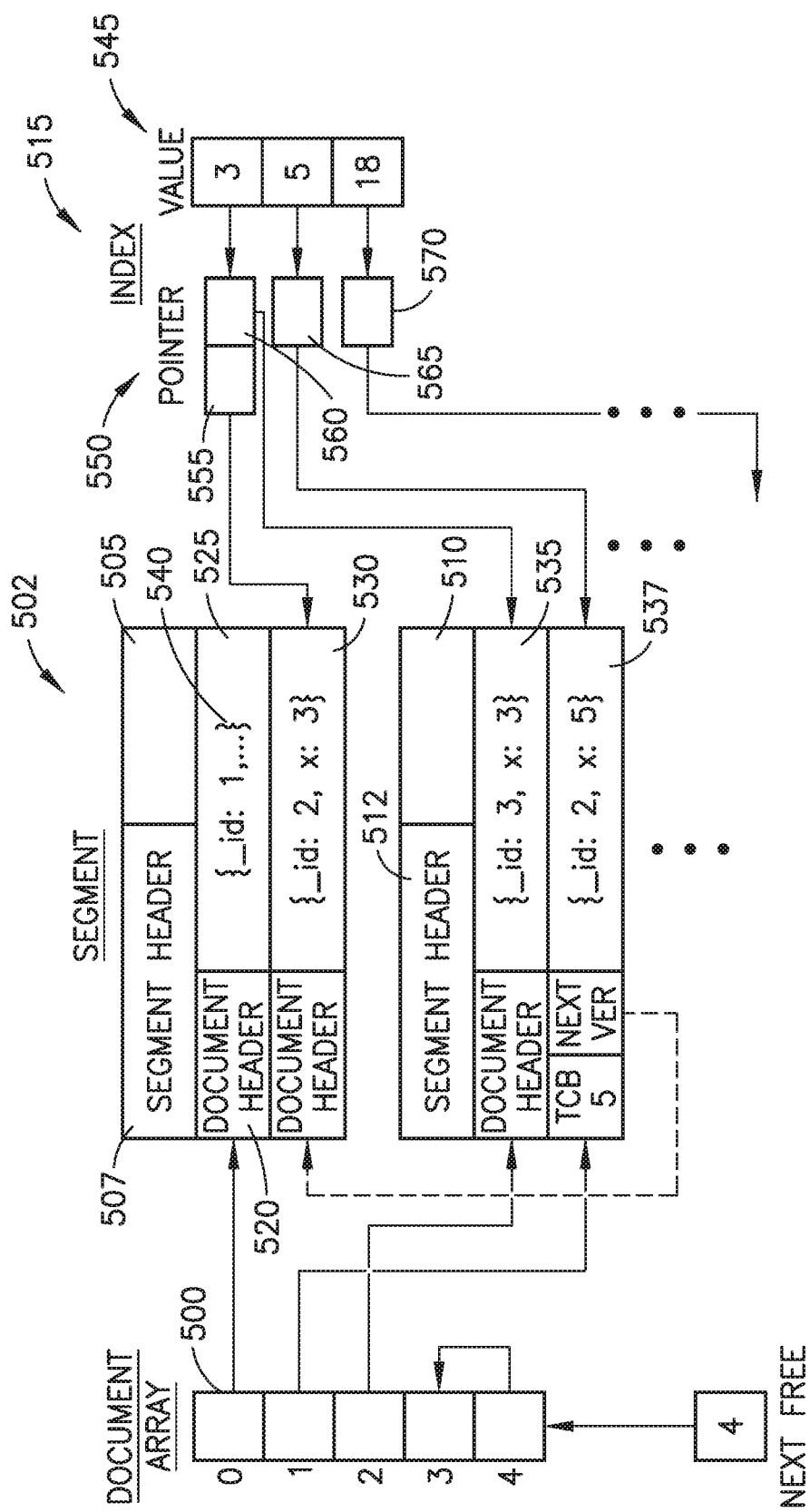
FIG. 5 is a diagram depicting a memory slice which includes an array referencing documents stored in segments which are referenced by an index.

FIG. 5 is a diagram depicting a memory slice which includes a document array 500 referencing documents stored in segments (505 and 510) which are referenced by an index 515. The document array 500 may reference documents stored in a number of segments (505 and 510), each having a segment header (507 and 512). Each stored document in the segment has a document header 520 to identify the locations in the data structure 502 occupied by the document. The segment data structure 502 may store the entire document in consecutive data locations of memory.

In the example depicted, document 1 (525) is stored in the first segment 505, document 2 (530) is also stored in the first segment 505, document 3 (535) is stored in the second segment 510. An newer version of document 2 (537) is also stored in the second segment 510 and refers to the next version (i.e., earlier version) of itself stored as document 2 (530) in the first segment 505. Following its respective header 520, each document includes one or more objects 540, e.g., an identifier-value pair with the identifier "x" and a corresponding value. An index 515 has been generated from the stored documents based on the identifier "x". In general, any number of identifiers in the stored documents may be included in the index 515 or provided in a separate index.

The index 515 includes an entry for each different value 545 corresponding to the "x" identifier found in the documents. In this example, the values 3, 5, and 18 are included in the index 515. Each value 545 stored in the index 515 has one or more corresponding pointers 550 which point to documents which contain the value in question. For example, the value 3 stored in the index 515 has two pointers: a pointer 555 which points to the older version of document 2 (530) stored in the first segment and another pointer 560 which points to document 3 (535). The value 5 stored in the index 515 has a corresponding pointer 565 which points to the newer version of document 2 (537) stored in the second segment 510. The value 18 has a corresponding pointer 570 which points to a document in another segment (not shown). The index 515 may be accessed, for example, in a database operation seeking all documents in which the identifier "x" has a value of 3. In such a case, the operation may return the two pointers (555 and 560) stored in the index, which will provide the locations of the specific documents, e.g., document 2 (530) and document 3 (535). Indexes must be built up, i.e., generated, and maintained as the underlying data changes. Moreover, the indexes must store a copy of the values (or hash values) used to perform the indexing, which is redundant with the values stored in the database corpus itself and requires a significant amount of memory resources.

Figure 6:
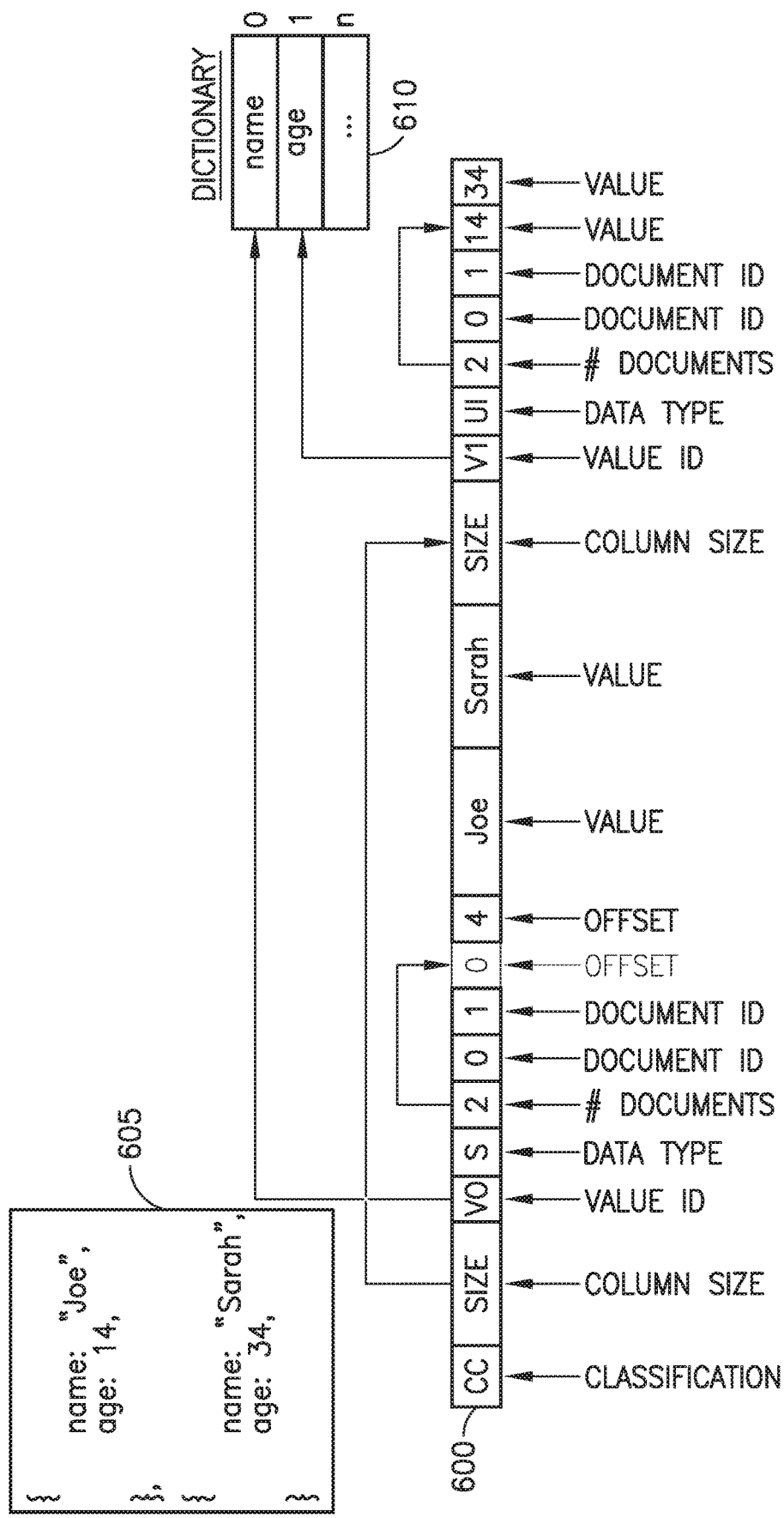
FIG. 6 is a data structure diagram showing documents containing JSON data being stored in columnar form as binary data compressed using a dictionary.

FIG. 6 is a data structure 600 diagram showing two example documents 605 containing JSON data being stored in columnar form as binary data compressed using a dictionary 610. As discussed in further detail below, this configuration has inherent search functionality and therefore does not use an index to perform search functions. In the example depicted, there are two documents, each having two identifier-value pairs, e.g., the identifiers "name" and "age" and their associated values. The documents are stored such that the first identifier-value pairs of the documents are stored in consecutive data locations of the data structure. The second identifier-value pairs of the documents are stored in consecutive data locations of a separate portion of the same data structure and/or a separate data structure. The data structures are therefore considered to be a columnar storage format of documents. In disclosed embodiments, only documents without open transactions may be stored in columnar form.

In the example depicted, the first field ("CC" for "Compressed Column") indicates that the classification of the data structure is dictionary-compressed columnar storage of documents. The second field indicates the size of the first "column" of the collection of documents, i.e., the first identifier-value pairs of the document ("name"). The third field is the valueID of the identifier of the first identifier-value pair, e.g., "V0," which indicates that the first identifier ("name") is the first entry in the dictionary of identifiers. The fourth field is the data type, "S," of the values associated with the first identifier ("name"), which indicates a string data type. The data type of the identifier itself ("name") need not be stored because identifiers are always strings.

The fifth field indicates the number of documents being stored in the column, i.e., the number of documents which contain the first identifier ("name"), which is two in this example. The next two fields are document identification numbers (IDs) identifying the documents which contain the first identifier ("name"). As discussed above, because the JSON data is schema-less, there may be documents in the collection which do not contain a particular identifier. Therefore, it is necessary to enumerate the documents which contain the identifier in question because such a sequence of documents will have gaps. In other words, a listing of values associated with the identifier in question cannot be assumed to correspond to a continuous sequence of documents. In this example, both documents contain the identifier "name". Therefore, an ID number 0 identifying the first document and an ID number 1 identifying the second document are located in two consecutive locations of the data structure. The number of documents specified immediately preceding the document IDs enables parsing of the data structure at the end of the document ID fields so they can be distinguished from subsequent fields discussed below.

The seceding data locations contain offset values which point to locations in the data structure where the values associated with the first identifier ("name") are stored for each document which contains this identifier-value pair (i.e., the documents identified by the document ID fields). In the example depicted, there is an offset of zero for the first value ("Joe") because it is stored in the first group of consecutive storage locations in the associated portion of the data structure. In disclosed embodiments, because the value (e.g., "Joe") associated with the first document (i.e., the first document containing the identifier, "name," as indicated by the document ID fields) will always have an offset of zero, this field may be omitted from the data structure.

The second offset field in this example has a value of 4 (i.e., 4 bytes), which indicates that the value ("Sarah") associated with the first identifier ("name") in the second document (i.e., the second document containing the first identifier, "name") begins in the fourth byte of the value fields, immediately after the value ("Joe") from the first document (i.e., the first document containing the identifier, "name"). The offset (4 bytes) for the value ("Sarah") of the second document implicitly provides the size of the value ("Joe") of the first document, i.e., 3 bytes. Therefore, it is not necessary to include size data in the data structure for the stored string values associated with the first identifier ("name"). The value ("Joe") associated with the first identifier ("name") in the first document (i.e., the first document containing the identifier, "name") is stored in the seceding three bytes and the value ("Sarah"), from the second document (i.e., the second document containing the identifier, "name"), is stored in the seceding four bytes of the data structure. Providing document IDs in fields which precede the offset fields is advantageous in terms of low level optimization (i.e., CPU optimization). Specifically, this configuration allows the CPU to process the data with a single instruction which is optimized for the size (determined based on the offset values) of the relevant portion of the data structure, e.g., an instruction which is optimized for 128 bits, as opposed to some other size.

The next field indicates the size of the second column of the collection of documents, i.e., the second identifier-value pairs of the document ("age"). The next field is the valueID of the identifier of the second identifier-value pair, e.g., "V1," which indicates that the second identifier ("age") is the second entry in the dictionary of identifiers. The next field is the data type, "UI," of the values associated with the second identifier ("age"), which indicates that the values are unsigned integers. The next field indicates the number of documents being stored in the column, i.e., the number of documents which contain the second identifier ("age"), which is two in this example. The next two fields are document identification numbers (IDs) identifying the documents which include the second identifier ("age").

As discussed above, the portion of the data structure 600 relating to the "name" identifier included fields containing offset values pointing to locations in the data structure where the values associated with the "name" identifier are stored for each document which contains this identifier-value pair (i.e., the documents identified by the document ID fields). However, because unsigned integers have a determined size, e.g., 8 bytes, there is no need for offset fields for this column. The unsigned integer value (e.g., 14) associated with the second identifier ("age") in the first document (i.e., the first document containing the identifier, "age") is stored in the next field and the value (e.g., 34) from the second document (i.e., the second document containing the identifier, "age") is stored in the seceding one-byte field.

Figure 7:
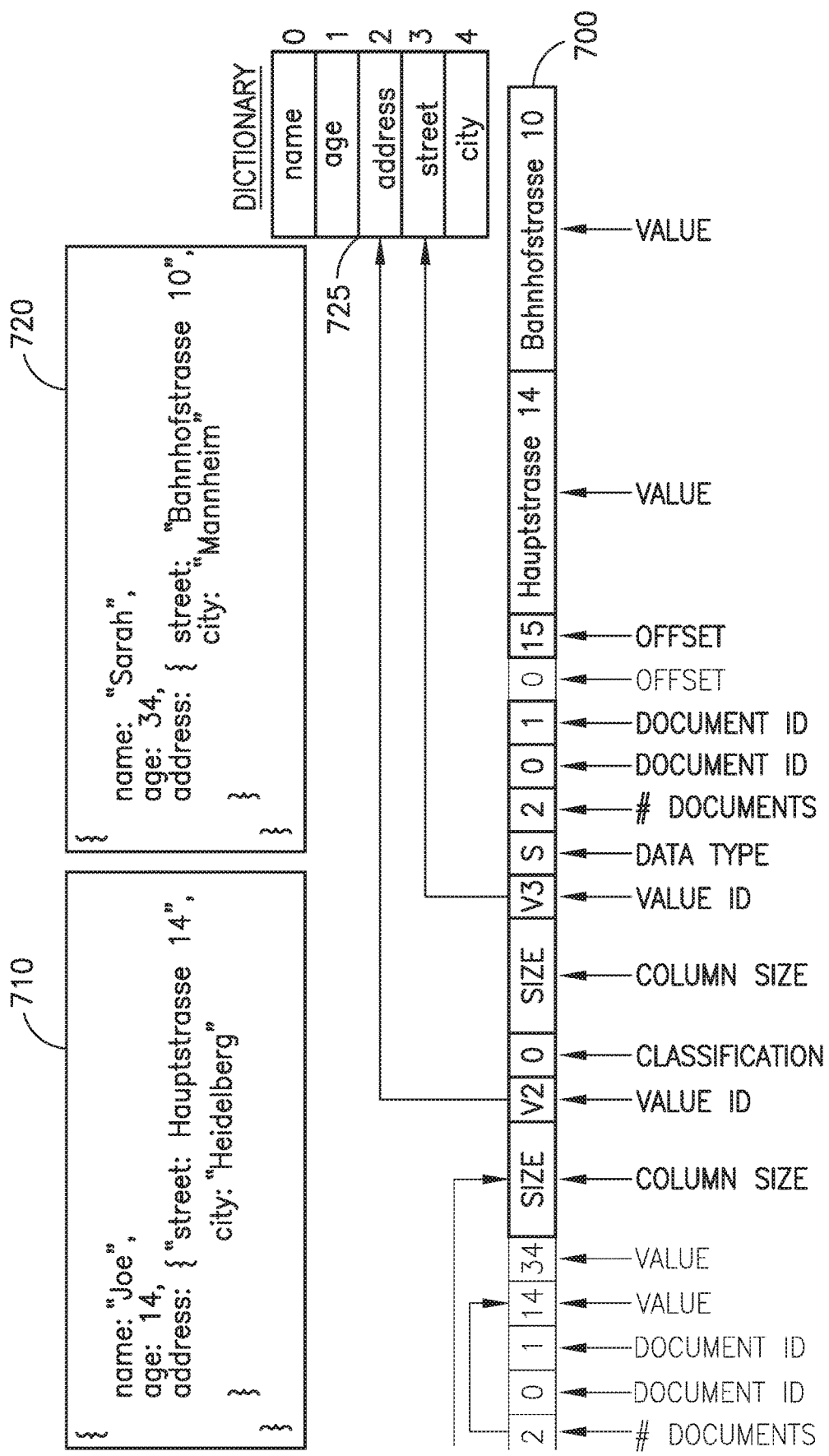
FIG. 7 is a data structure diagram showing documents containing JSON data, including nested objects, being stored in columnar form as binary data compressed using a dictionary.

FIG. 7 is a data structure 700 diagram showing two documents (710 and 720) containing JSON data, including nested objects, being stored in columnar form as binary data compressed using a dictionary 725. The two documents (710 and 720) in this example are the same as those discussed above but with the addition of a third identifier, "address". The values associated with the "address" identifier are objects, rather than a string or unsigned integer. Specifically, the objects are a nested set of two identifier-value pairs: "street" with an associated string value and "city" with an associated string value.

In the example depicted, the first field following the stored values of the "age" identifier is a size field ("COLUMN SIZE") which indicates the size of the third column of the collection of documents, i.e., the identifier-value pairs of the third identifier ("address"). The next field is the valueID of the identifier of the third identifier-value pair, e.g., "V2," which indicates that the third identifier ("address") is the third entry in the dictionary of identifiers. The next field is the data type, "O," of the values associated with the third identifier ("address"), which indicates an object data type. The next field is the size (e.g., in bytes) of the object associated with the "address" identifier (which may be referred to as a "column size" because the object contains nested identifier-value pairs which are stored in columnar form).

The next field is the valueID of the identifier of the first nested identifier-value pair of the "address" object, e.g., "V3," which indicates that the identifier, "street," is the fourth entry in the dictionary of identifiers. The next field is the data type, "S," of the values associated with the first nested identifier ("street"), which indicates a string data type. The next field indicates the number of documents being stored in the column, i.e., the number of documents which contain the first nested identifier ("street"), which is two in this example. The next two fields are document identification numbers (IDs) identifying the documents which include the first nested identifier ("street").

The seceding data locations contain offset values which point to locations in the data structure where the values associated with the first nested identifier ("street") are stored for each document which contains this identifier-value pair (i.e., the documents identified by the document ID fields). In the example depicted, there is an offset of zero for the first value ("Hauptstrasse 14") because it is stored in the first group of consecutive storage locations in the associated portion of the data structure. In disclosed embodiments, because the value (e.g., "Hauptstrasse 14") associated with the first document (i.e., the first document containing the nested identifier, "street," as indicated by the document ID fields) will always have an offset of zero, this field may be omitted from the data structure.

The second offset field in this example has a value of 15 (i.e., 15 bytes), which indicates that the value ("Bahnhofstrasse 10") associated with the first nested identifier ("street") in the second document (i.e., the second document containing the first nested identifier, "street") begins in the sixteenth byte of the value fields, immediately after the value ("Hauptstrasse 14") from the first document (i.e., the first document containing the first nested identifier, "street"). The offset (15 bytes) for the value ("Bahnhofstrasse 10") of the second document implicitly provides the size of the value ("Hauptstrasse 14") of the first document, i.e., 15 bytes. Therefore, it is not necessary to include size data in the data structure for the stored string values associated with the first nested identifier ("street"). The value ("Hauptstrasse 14") associated with the first nested identifier ("street") in the first document (i.e., the first document containing the identifier, "street") is stored in the seceding 15 bytes and the value ("Bahnhofstrasse 10"), from the second document (i.e., the second document containing the nested identifier, "street"), is stored in the seceding 17 bytes of the data structure.

Figure 8:
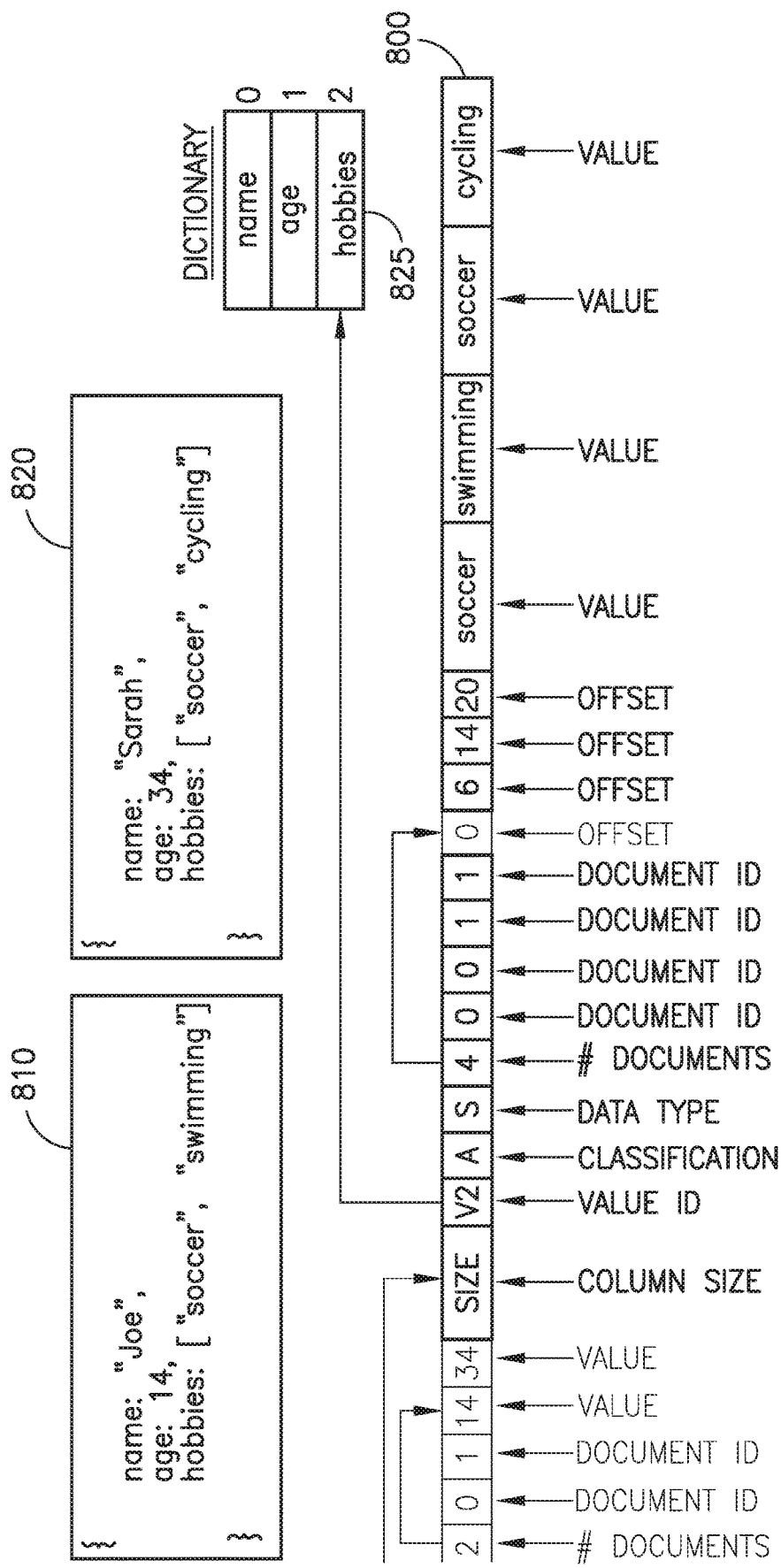
FIG. 8 is a data structure diagram showing documents containing JSON data, including arrays, being stored in columnar form as binary data compressed using a dictionary.

FIG. 8 is a data structure 800 diagram showing two documents (810 and 820) containing JSON data, including arrays, being stored in columnar form as binary data compressed using a dictionary 825. The two documents (810 and 820) in this example are the same as those discussed above (with respect to FIG. 6) but with the addition of a third identifier, "hobbies". The value associated with the "hobbies" identifier is an array, rather than a string, unsigned integer, or object. Specifically, the array is a set of data values, such as, for example, a set of strings.

In the example depicted, the first field following the stored values of the "age" identifier is a size field ("COLUMN SIZE") which indicates the size of the third column of the collection of documents, i.e., the identifier-value pairs of the third identifier ("hobbies"). The next field is the valueID of the identifier of the third identifier-value pair, e.g., "V2," which indicates that the third identifier ("hobbies") is the third entry in the dictionary of identifiers. The next field is the data type, "A," of the values associated with the third identifier ("hobbies"), which indicates an array data type. The next field is the data type, "S," of the values associated with the third identifier ("hobbies"), which indicates a string data type (i.e., an array of strings).

The next field, number of documents, indicates the number of values being stored in the column, i.e., the number of values in the documents which contain the identifier ("hobbies"), which is four in this example (in the previous examples, for string, unsigned integers, and objects, there is only one value per identifier in each document, so this parameter was described as "the number of documents which contain the identifier"). The next four fields are document identification numbers (IDs) identifying the documents which include the third identifier ("hobbies"), with the document ID of a particular document being repeated to appear a number of times which is equal to the number of values in the array associated with the third identifier ("hobbies") for that particular document. In the example depicted, both documents have an array of two values associated with the third identifier ("hobbies"). Therefore, the document ID for each document has two occurrences in the data structure.

The seceding data locations contain offset values which point to locations in the data structure where the array values associated with the third identifier ("hobbies") are stored for each document which contains this identifier-value pair (i.e., the documents identified by the document ID fields). In the example depicted, there is an offset of zero for the first array value ("Soccer") because it is stored in the first group of consecutive storage locations in the associated portion of the data structure. In disclosed embodiments, because the first array value (e.g., "soccer") associated with the first document (i.e., the first document containing the identifier, "hobbies," as indicated by the document ID fields) will always have an offset of zero, this field may be omitted from the data structure.

The second offset field in this example has a value of 6 (i.e., 6 bytes), which indicates that the second array value ("swimming") associated with the identifier ("hobbies") in the first document (i.e., the first document containing the identifier, "hobbies") begins in the seventh byte of the value fields, immediately after the value ("soccer") from the first array value of the first document.

The third offset field in this example has a value of 14 (i.e., 14 bytes), which indicates that the first array value ("soccer") associated with the identifier ("hobbies") in the second document (i.e., the second document containing the identifier, "hobbies") begins in the fifteenth byte of the value fields, immediately after the value ("swimming") from the first document (i.e., the first document containing the identifier "hobbies").

The fourth offset field in this example has a value of 20 (i.e., 20 bytes), which indicates that the second array value ("cycling") associated with the identifier ("hobbies") in the second document (i.e., the second document containing the identifier, "hobbies") begins in the twenty-first byte of the value fields, immediately after the value ("soccer") from the first array value of the second document.

Based on the offset values, the array values ("soccer" and "swimming") associated with the third identifier ("hobbies") in the first document and the array values ("soccer" and "cycling") associated with the third identifier ("hobbies") in the second document are stored in (and/or retrieved from) the value fields of the data structure.

Figure 9:
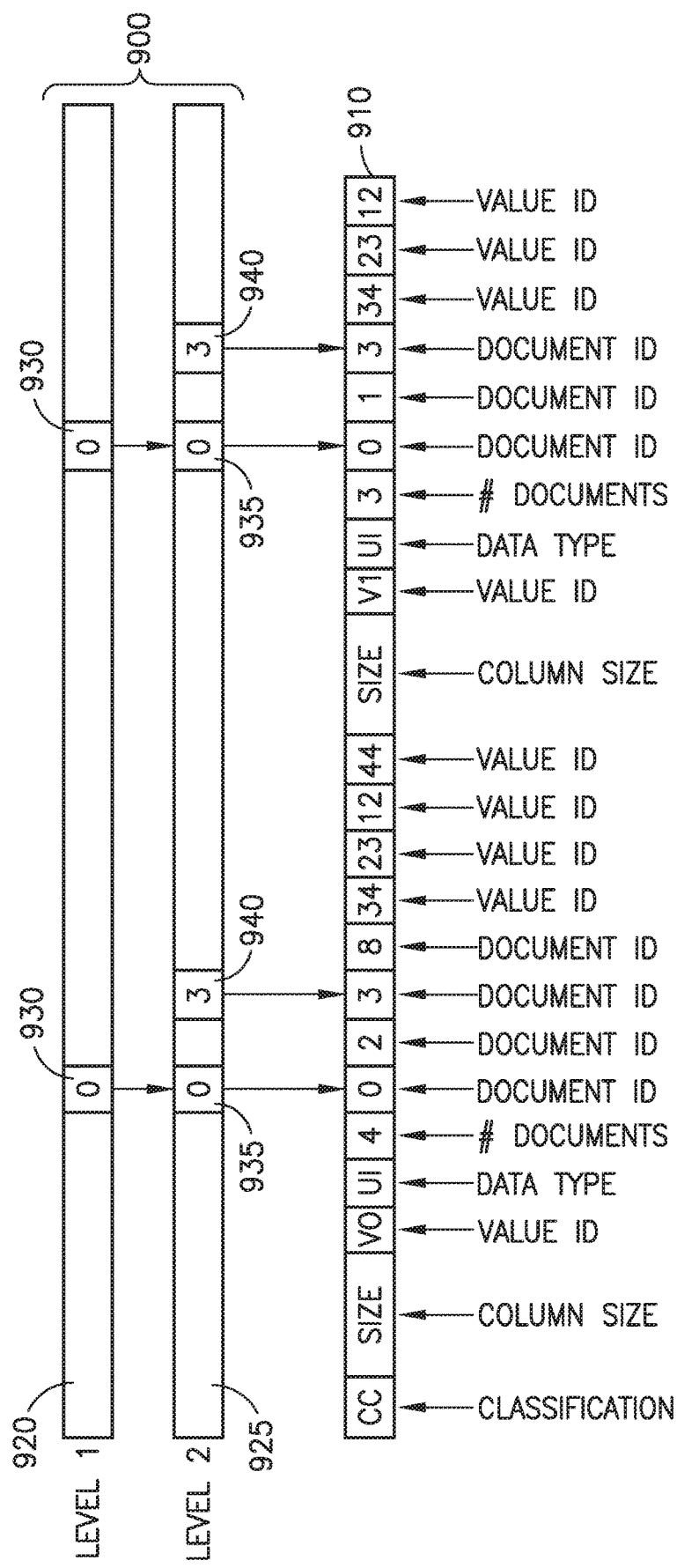
FIG. 9 depicts the use of a skip list to search for elements of a particular document in a data store of documents containing JSON data stored in columnar form.

FIG. 9 depicts the use of a skip list 900 to search for elements of a particular document in a data store of documents containing JSON data stored in a columnar form data structure 910. One characteristic of a columnar form of storage for documents in a collection is that filtering documents based on whether a particular identifier has a particular value, or range of values, is less burdensome because all of the values for the identifier in question will be found in a single consecutive data block or portion of a data structure, i.e., a single column. However, in a columnar data structure, to retrieve an entire document which has been identified as meeting the filter parameters, it may be necessary locate pieces of the document in several different data structures or portions of data structures, i.e., several columns. As discussed above, the elements, e.g., objects, of a document may be stored in a number of separate column data structures, each element being identified with a document ID stored in the data structure (see, e.g., FIG. 6). Therefore, the task of retrieving an entire document in a columnar document store requires searching a number of data structures for a particular document ID.

A columnar data structure 910 may be searched in a sequential manner for a given document ID, which may occur multiple times within the data structure. Such a search is time consuming because it requires searching the entire data structure. A skip list is a data structure that allows for faster searching within an ordered sequence of elements. A fast search is made possible by maintaining a linked hierarchy of sub-sequences, e.g., the list levels designated as Level 1 (920) and Level 2 (925), each of which contains a subset of the ordered sequence of elements, while "skipping" the remaining elements. Each successive level skips over fewer elements than the previous one. The elements that are skipped over may be chosen probabilistically or deterministically.

Searching starts in the sparsest level, i.e., Level 1 (920), which contains all occurrences 930 of only the document 0 (i.e., document ID=0). If, for example, the document with document 2 is being sought, Level 1 does not contain the document in question, so search continues to next sparsest level of the skip list, i.e., Level 2, which contains, e.g., all occurrences 935 of document 0 and all occurrences 940 of document 3. Due to the linked hierarchy of the skip list levels, the occurrences 930 of document 0 found in Level 1 link to corresponding elements (935) in Level 2. Level 2 (and any subsequent levels) is searched until two consecutive documents have been found which bracket the document being sought, e.g., a document ID smaller than and a document ID larger than or equal to the document ID being sought. In the example depicted in FIG. 9, the occurrences of document 0 (935) and document 3 (940) meet these criteria with respect to document 2.

The occurrences of document 0 and 3 (935 and 940) found in Level 2 link to documents of the next sparsest level, which in this example is the data structure itself. In disclosed embodiments, additional layers may be included in the skip list, with each subsequent list having a decreasing number of skipped documents. In such a case, the search process continues level-by-level in the skip list until the underlying data structure is reached. The identified locations, i.e., occurrences, of documents 0 and 3 (935 and 940) in Level 2 of the data structure 910 serve, in effect, as search windows within which document 2 is found. Searching these windows requires significantly less resources than searching the entire data structure. Thus, by virtue of this configuration, which combines the use of a skip list 900 with a columnar data structure 910 for storing documents, identifying documents which meet filter parameters (e.g., which hold a particular value) and locating the identified documents in their entirety, if this is necessary, can be done efficiently.

As noted above, an index provides an alternative way of finding the documents which hold a particular value. For example, to find documents with the value "soccer," the value can be looked up in the index, which has pointers to the documents being sought. In addition, the documents are each stored in largely contiguous locations, which makes it easier to obtain the identified documents in their entirety. However, indexes must be built up, i.e., generated, and maintained as the underlying data changes. Moreover, the indexes must store a copy of the values (or hash values) used to perform the indexing, which is redundant with the values stored in the database corpus itself and requires a significant amount of memory resources. A columnar data structure, on the other hand, does not require extra memory for search because it implicitly stores the values which are used for in performing a search.

Figure 10:
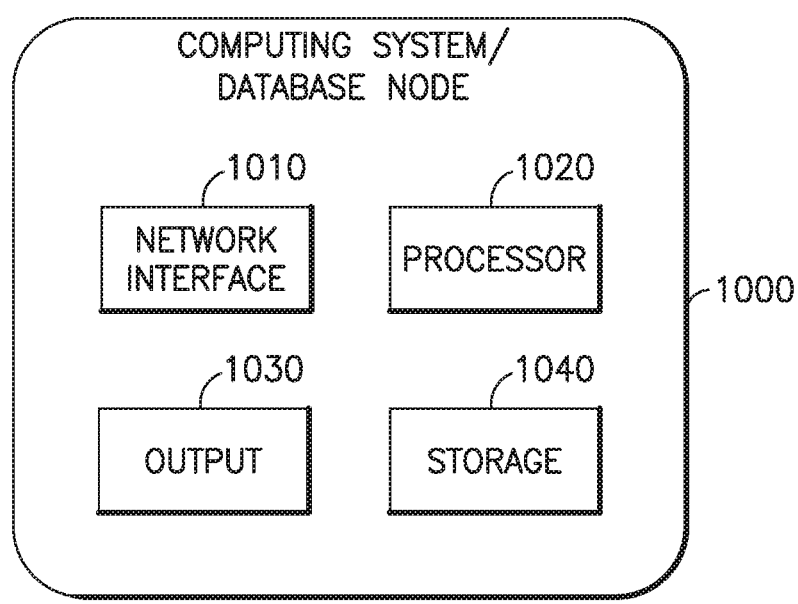
FIG. 10 is a block diagram of a system according to some embodiments.

FIG. 10 is a block diagram of apparatus 1000 according to some embodiments. Apparatus 1000 may comprise a general-purpose or special-purpose computing apparatus and may execute program code to perform any of the functions described herein. Apparatus 1000 may comprise an implementation of one or more elements of system 100. Apparatus 1000 may include additional elements which are not shown, according to some embodiments.

Apparatus 1000 includes processor 1010 operatively coupled to communication device 1020, data storage device/memory 1030, one or more input devices 1040, and one or more output devices 1050. Communication device 1020 may facilitate communication with external devices, such as an application server. Input device(s) 1040 may comprise, for example, a keyboard, a keypad, a mouse or other pointing device, a microphone, knob or a switch, an infrared (IR) port, a docking station, and/or a touch screen. Input device(s) 1040 may be used, for example, to manipulate graphical user interfaces and to input information into apparatus 1000. Output device(s) 1050 may comprise, for example, a display (e.g., a display screen) a speaker, and/or a printer.

Data storage device/memory 1030 may comprise any device, including combinations of magnetic storage devices (e.g., magnetic tape, hard disk drives and flash memory), optical storage devices, Read Only Memory (ROM) devices, Random Access Memory (RAM) etc.

The storage device 1030 stores a program 1012 and/or platform logic 1014 for controlling the processor 1010. The processor 1010 performs instructions of the programs 1012, 1014, and thereby operates in accordance with any of the embodiments described herein, including but not limited to the processes.

The programs 1012, 1014 may be stored in a compressed, uncompiled and/or encrypted format. The programs 1012, 1014 may furthermore include other program elements, such as an operating system, a database management system, and/or device drivers used by the processor 1010 to interface with peripheral devices.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of computing devices in communication with one another via any number of other public and/or private networks. Two or more of such computing devices of may be located remote from one another and may communicate with one another via any known manner of network(s) and/or a dedicated connection. Each computing device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more computer-readable non-transitory media. Such media non-transitory media may include, for example, a fixed disk, a floppy disk, a CD-ROM, a DVD-ROM, a Flash drive, magnetic tape, and solid state RAM or ROM storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A data storage and retrieval system for a computer memory, the system comprising:
   a processor programmed to configure the computer memory according to a schema-less columnar document store adapted to contain two or more documents, each document comprising two or more identifier-value pairs, the schema-less columnar document store comprising:
   a dictionary containing one or more identifiers of the identifier-value pairs, each of the identifiers being associated in the dictionary with a value identifier (ID);
   a data structure having a plurality of fields and containing a first column and at least a second column, the first column being associated with a first identifier of the one or more identifiers and the second column being associated with a second identifier of the one or more identifiers, the first identifier being associated with a first set of values in a first set of documents which contain the first identifier and the second identifier being associated with a second set of values in the first set of documents which contain the second identifier, the first set of documents comprising a first document and at least a second document, the first column comprising: a value identifier (ID) of the first identifier, one or more document identifiers (IDs), each identifying a document in the first set of documents, and the first set of values; wherein all of the first set of values of the first identifier for each of the first document and the at least the second document are stored in a first section of consecutive data locations and all of the second set of values of the first identifier for each of the first document and the at least the second document are stored in a second section of consecutive data locations, wherein the second column is associated with a second identifier of the one or more identifiers, the second identifier being associated with a set of array values in a second set of documents which contain the second identifier, the second column comprising:

a value identifier (ID) of the second identifier, a classification of the second column indicating an array, one or more document identifiers (IDs), each identifying a document containing one or more array values of the set of array values, the document identifiers (IDs) being repeated for each array value contained in a respective document, and the set of array values stored at successive positions in the data structure.

2. The system of claim 1, wherein the first column further comprises: a size of the first column, a data type of the first set of values, and a count of the first set of documents.

3. The system of claim 1, wherein, if the data type of the first set of values is string, the first column further comprises offsets in correspondence with the document identifiers (IDs), or in correspondence with all but a first one of the document identifiers (IDs), and the first set of values is stored at positions indicated by the offsets.

4. The system of claim 3, wherein the offsets are all stored in the data structure at positions which precede the stored first set of values.

5. The system of claim 1, wherein the data structure further contains the second column following the first column, the second column being associated with a second identifier of the one or more identifiers, the second identifier being associated with a second set of values in a second set of documents which contain the second identifier, the second column comprising:

a value identifier (ID) of the second identifier, one or more document identifiers (IDs), each identifying a document in the second set of documents, and the second set of values stored at successive positions in the data structure.

6. The system of claim 1, wherein the data structure further contains: the second column following the first column, the second column being associated with a second identifier of the one or more identifiers, the second identifier being associated with a second set of values in a second set of documents which contain the second identifier, the second column comprising: a value identifier (ID) of the second identifier, and a classification of the second column indicating a nested object, a third column for storing the nested object, the third column being associated with a third identifier of the one or more identifiers, the third identifier being associated with a third set of values in a third set of documents which contain the third identifier, the third column comprising: a value identifier (ID) of the third identifier, one or more document identifiers (IDs), each identifying a document in the third set of documents, the third set of values stored at successive positions in the data structure.

7. A method for storing and retrieving data in a computer system having a computer memory and a processor, the method comprising:

configuring the computer memory according to a schema-less columnar document store adapted to contain two or more documents, each document comprising two or more identifier-value pairs, the schema-less columnar document store comprising:

a dictionary containing one or more identifiers of the identifier-value pairs, each of the identifiers being associated in the dictionary with a value identifier (ID);

a data structure having a plurality of fields and containing a first column and at least a second column, the first column being associated with a first identifier of the one or more identifiers and the second column being associated with a second identifier of the one or more identifiers, the first identifier being associated with a first set of values in a first set of documents which contain the first identifier and the second identifier being associated with a second set of values in the first set of documents which contain the second identifier, the first set of documents comprising a first document and at least a second document, the first column comprising: a value identifier (ID) of the first identifier, one or more document identifiers (IDs), each identifying a document in the first set of documents, and the first set of values; wherein all of the first set of values of the first identifier for each of the first document and the at least the second document are stored in a first section of consecutive data locations and all of the second set of values of the first identifier for each of the first document and the at least the second document are stored in a second section of consecutive data locations, wherein the second column is associated with a second identifier of the one or more identifiers, the second identifier being associated with a set of array values in a second set of documents which contain the second identifier, the second column comprising:

a value identifier (ID) of the second identifier, a classification of the second column indicating an array, one or more document identifiers (IDs), each identifying a document containing one or more array values of the set of array values, the document identifiers (IDs) being repeated for each array value contained in a respective document, and the set of array values stored at successive positions in the data structure.

8. The method of claim 7, wherein the first column further comprises: a size of the first column, a data type of the first set of values, and a count of the first set of documents.

9. The method of claim 7, wherein, if the data type of the first set of values is string, the first column further comprises offsets in correspondence with the document identifiers (IDs), or in correspondence with all but a first one of the document identifiers (IDs), and the first set of values is stored at positions indicated by the offsets.

10. The method of claim 9, wherein the offsets are all stored in the data structure at positions which precede the stored first set of values.

11. The method of claim 7, wherein the data structure further contains the second column following the first column, the second column being associated with a second identifier of the one or more identifiers, the second identifier being associated with a second set of values in a second set of documents which contain the second identifier, the second column comprising:
- a value identifier (ID) of the second identifier,
- one or more document identifiers (IDs), each identifying a document in the second set of documents, and
- the second set of values stored at successive positions in the data structure.

12. The method of claim 7, wherein the data structure further contains:
- the second column following the first column, the second column being associated with a second identifier of the one or more identifiers, the second identifier being associated with a second set of values in a second set of documents which contain the second identifier, the second column comprising: a value identifier (ID) of the second identifier, and a classification of the second column indicating a nested object, a third column for storing the nested object, the third column being associated with a third identifier of the one or more identifiers, the third identifier being associated with a third set of values in a third set of documents which contain the third identifier, the third column comprising: a value identifier (ID) of the third identifier, one or more document identifiers (IDs), each identifying a document in the third set of documents, the third set of values stored at successive positions in the data structure.

13. A non-transitory computer-readable storage medium storing program instructions that when executed cause a processor to perform a method for storing and retrieving data in a computer system having a computer memory, the method comprising:
  configuring the computer memory according to a schema-less columnar document store adapted to contain two or more documents, each document comprising two or more identifier-value pairs, the schema-less columnar document store comprising:
    a dictionary containing one or more identifiers of the identifier-value pairs, each of the identifiers being associated in the dictionary with a value identifier (ID);
    a data structure having a plurality of fields and containing a first column and at least a second column, the first column being associated with a first identifier of the one or more identifiers and the second column being associated with a second first identifier of the one or more identifiers, the first identifier being associated with a first set of values in a first set of documents which contain the first identifier and the second identifier being associated with a second set of values in the first set of documents which contain the second identifier, the first set of documents comprising a first document and at least a second document, the first column comprising: a value identifier (ID) of the first identifier, one or more document identifiers (IDs), each identifying a document in the first set of documents, and the first set of values; wherein all of the first set of values of the first identifier for each of the first document and the at least the second document are stored in a first section of consecutive data locations and all of the second set of values of the first identifier for each of the first document and the at least the second document are stored in a second section of consecutive data locations,
    wherein the second column is associated with a second identifier of the one or more identifiers, the second identifier being associated with a set of array values in a second set of documents which contain the second identifier, the second column comprising:
      a value identifier (ID) of the second identifier,
      a classification of the second column indicating an array,
      one or more document identifiers (IDs), each identifying a document containing one or more array values of the set of array values, the document identifiers (IDs) being repeated for each array value contained in a respective document, and
    the set of array values stored at successive positions in the data structure.

14. The computer-readable storage medium of claim 13, wherein the first column further comprises: a size of the first column, a data type of the first set of values, and a count of the first set of documents.

15. The computer-readable storage medium of claim 13, wherein, if the data type of the first set of values is string, the first column further comprises offsets in correspondence with the document identifiers (IDs), or in correspondence with all but a first one of the document identifiers (IDs), and the first set of values is stored at positions indicated by the offsets.

16. The computer-readable storage medium of claim 13, wherein the data structure further contains the second column following the first column, the second column being associated with a second identifier of the one or more identifiers, the second identifier being associated with a second set of values in a second set of documents which contain the second identifier, the second column comprising:
- a value identifier (ID) of the second identifier,
- one or more document identifiers (IDs), each identifying a document in the second set of documents, and
- the second set of values stored at successive positions in the data structure.

17. The computer-readable storage medium of claim 13, wherein the data structure further contains:
  the second column following the first column, the second column being associated with a second identifier of the one or more identifiers, the second identifier being associated with a second set of values in a second set of documents which contain the second identifier, the second column comprising: a value identifier (ID) of the second identifier, and a classification of the second column indicating a nested object,
  a third column for storing the nested object, the third column being associated with a third identifier of the one or more identifiers, the third identifier being associated with a third set of values in a third set of documents which contain the third identifier, the third column comprising: a value identifier (ID) of the third identifier, one or more document identifiers (IDs), each identifying a document in the third set of documents, the third set of values stored at successive positions in the data structure.

* * * * *